(12) United States Patent
Ding et al.

(10) Patent No.: US 9,449,309 B2
(45) Date of Patent: *Sep. 20, 2016

(54) MANAGING EMAILS AT AN ELECTRONIC MAIL CLIENT

(75) Inventors: Hong W Ding, Beijing (CN); Jin Dong, Beijing (CN); Xiao Q Wang, Beijing (CN); Minmin Qiu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 367 days.

This patent is subject to a terminal disclaimer.

(21) Appl. No.: 13/460,358

(22) Filed: Apr. 30, 2012

(65) Prior Publication Data

US 2012/0216128 A1 Aug. 23, 2012

Related U.S. Application Data

(63) Continuation of application No. 13/332,223, filed on Dec. 20, 2011.

(30) Foreign Application Priority Data

Jan. 30, 2011 (CN) .......................... 2011 1 0035164

(51) Int. Cl.
*G06F 3/048* (2013.01)
*G06Q 10/10* (2012.01)

(52) U.S. Cl.
CPC .................................. *G06Q 10/107* (2013.01)

(58) Field of Classification Search
CPC ...... G06Q 10/07; G06Q 10/10; H04L 51/16; H04L 12/58; G06F 17/30386; G06F 3/048; G06F 3/0482; G06F 17/211; G06F 17/30625

USPC .......................................................... 715/752
See application file for complete search history.

(56) References Cited

U.S. PATENT DOCUMENTS

| | | |
|---|---|---|
| 6,910,189 B2 | 6/2005 | Abdelhadi et al. |
| 7,490,131 B2 | 2/2009 | Maller |
| 7,506,263 B1 * | 3/2009 | Johnston .............. G06Q 10/107 709/206 |
| 7,756,938 B2 | 7/2010 | Edmunds et al. |

(Continued)

FOREIGN PATENT DOCUMENTS

| | | |
|---|---|---|
| CN | 1767504 | 5/2006 |
| CN | 101079827 | 11/2007 |

OTHER PUBLICATIONS

Joan Lambert et al., "Microsoft Outlook 2010 Step by Step," Microsoft Press, Jul. 2010, chapters 7 and 3.*

(Continued)

*Primary Examiner* — Amy Ng
*Assistant Examiner* — Sang H Kim
(74) *Attorney, Agent, or Firm* — DeLizio Law, PLLC

(57) ABSTRACT

Some example embodiments include a method for managing emails The method includes identifying a plurality of emails having a same subject The method also includes determining an inclusion relationship among the plurality of emails The method includes providing a user interface at an email client end The method includes graphically displaying on the user interface the plurality of emails and the inclusion relationship among the plurality of emails, wherein the graphically displaying of the inclusion relationship comprises identifying content that is duplicated across at least two emails within the plurality of emails.

8 Claims, 16 Drawing Sheets

(56) References Cited

U.S. PATENT DOCUMENTS

| | | | |
|---|---|---|---|
| 2003/0163537 A1* | 8/2003 | Rohall | G06Q 10/107 709/206 |
| 2004/0044735 A1 | 3/2004 | Hoblit | |
| 2006/0036696 A1* | 2/2006 | Maresh | H04L 12/58 709/206 |
| 2006/0143274 A1 | 6/2006 | Schulz et al. | |
| 2006/0161849 A1* | 7/2006 | Miller | G06F 9/4443 715/744 |
| 2007/0038710 A1 | 2/2007 | Li et al. | |
| 2008/0104183 A1* | 5/2008 | Eldering | G06Q 10/107 709/206 |
| 2008/0162651 A1 | 7/2008 | Madnani | |
| 2008/0215687 A1 | 9/2008 | Madnani | |
| 2008/0215697 A1 | 9/2008 | Kushmerick et al. | |
| 2009/0287780 A1 | 11/2009 | Gawor et al. | |
| 2010/0076989 A1* | 3/2010 | Jakobson | G06Q 10/00 707/758 |
| 2010/0088377 A1 | 4/2010 | Johnson et al. | |
| 2011/0314384 A1* | 12/2011 | Lindgren | G06Q 10/107 715/739 |
| 2012/0198356 A1 | 8/2012 | Ding et al. | |

OTHER PUBLICATIONS

U.S. Appl. No. 13/332,223, filed Dec. 20, 2011, Ding, Hong W., et al.

"U.S. Appl. No. 13/332,223 Office Action", Jun. 19, 2014, 13 Pages.

Lambert, et al., "Microsoft Outlook 2010 Step by Step", safaribooksonline.com, Jul. 1, 2010, 75 Pages.

"U.S. Appl. No. 13/332,223 Final Office Action", Dec. 4, 2014, 14 pages.

"U.S. Appl. No. 13/332,223 Office Action", Mar. 12, 2015, 15 Pages.

"U.S. Appl. No. 13/332,223 Office Action", Jan. 6, 2016, 30 pages.

\* cited by examiner

STRUCTURE TABLE 1

| ROW | SUBJECT | SENDER | RECIPIENT | CC RECIPIENT | RECEPTION TIME | ATTACHMENT SIZE | BODY SIZE | OTHERS |
|---|---|---|---|---|---|---|---|---|
| 1 | SOS | ALEX | BOB, CATHY | FRANK | 2011-01-17 8:00:19 | 2 M | 80 K | |

FIG. 4A

STRUCTURE TABLE 2

| ROW | SUBJECT | SENDER | RECIPIENT | CC RECIPIENT | RECEPTION TIME | ATTACHMENT SIZE | BODY SIZE | |
|---|---|---|---|---|---|---|---|---|
| 1 | RE: SOS | BOB | ALEX | DAVID, FRANK, GAVIN | 2011-01-17 8:30:12 | | 120 K | |
| 2 | SOS | ALEX | BOB, CATHY | FRANK | 2011-01-17 8:00:19 | 2 M | 80 K | |

FIG. 4B

STRUCTURE TABLE 3

| ROW | SUBJECT | SENDER | RECIPIENT | CC RECIPIENT | RECEPTION TIME | ATTACHMENT SIZE | BODY SIZE | OTHERS |
|---|---|---|---|---|---|---|---|---|
| 1 | RE: SOS | CATHY | ALEX | FRANK, HELEN | 2011-01-17 8:40:22 | | 90 K | |

FIG. 4C

STRUCTURE TABLE 4

| ROW | SUBJECT | SENDER | RECIPIENT | CC RECIPIENT | RECEPTION TIME | ATTACHMENT SIZE | BODY SIZE | OTHERS |
|---|---|---|---|---|---|---|---|---|
| 1 | FWD: RE: SOS | DAVID | EMMA | FRANK, GAVIN, IAN | 2011-01-17 9:00:12 | 3 M | 190 K | |
| 2 | RE: SOS | BOB | ALEX | DAVID, FRANK, GAVIN | 2011-01-17 8:30:12 | | 120 K | |
| 3 | SOS | ALEX | BOB, CATHY | FRANK | 2011-01-17 8:00:19 | 2 M | 80 K | |

FIG 4D

STRUCTURE TABLE 5

| ROW | SUBJECT | SENDER | RECIPIENT | CC RECIPIENT | RECEPTION TIME | ATTACHMENT SIZE | BODY SIZE | OTHERS |
|---|---|---|---|---|---|---|---|---|
| 1 | RE: FWD: RE: SOS | EMMA | DAVID | FRANK, GAVIN, IAN | 2011-01-17 9:30:15 | | 280 K | |
| 2 | FWD: RE: SOS | DAVID | EMMA | FRANK, GAVIN, IAN | 2011-01-17 9:00:12 | 3 M | 190 K | |
| 3 | RE: SOS | BOB | ALEX | DAVID, FRANK, GAVIN | 2011-01-17 8:30:12 | | 120 K | |
| 4 | SOS | ALEX | BOB, CATHY | FRANK | 2011-01-17 8:00:19 | 2 M | 80 K | |

FIG 4E

MANAGING EMAILS AT AN ELECTRONIC MAIL CLIENT

RELATED APPLICATION

This application claims the priority benefit of U.S. application Ser. No. 13/332,223 filed Dec. 20, 2011 which claims priority under 35 U.S.C. 119 from Chinese Patent Application No. 201110035164.4 filed Jan. 30, 2011, the entire contents of which are incorporated herein by reference.

BACKGROUND

The present inventive subject matter relates to an email system of a computer network, and more particularly, to managing emails at an email client end.

Email is a communication tool widely used in the Internet. In a cooperative working environment, people often communicate information and discuss questions regarding a particular subject via email on the Internet during a period of time. In this case, an email sent by a sender to one or more recipients may be replied to or forwarded by the one or more recipients, and such replying or forwarding may be constantly repeated. As a result of this communication manner, the recipient may successively receive emails with repetitive content in his/her email box. For example, the whole content of one email is completely included in another email. In this case, although the recipient only needs to read the other email, the recipient always has to open both emails separately because he/she did not know that the whole content of the one email has been included in the other email.

SUMMARY

Some example embodiments include a method for managing emails. The method includes identifying a plurality of emails having a same subject. The method also includes determining an inclusion relationship among the plurality of emails. The method includes providing a user interface at an email client end. The method includes graphically displaying on the user interface the plurality of emails and the inclusion relationship among the plurality of emails, wherein the graphically displaying of the inclusion relationship comprises identifying content that is duplicated across at least two emails within the plurality of emails.

Some example embodiments include a method for managing emails that includes identifying a plurality of emails having a same subject. The method includes determining an inclusion relationship among the plurality of emails. The method also includes providing a user interface at an email client end. The method includes graphically displaying on the user interface the plurality of emails and the inclusion relationship among the plurality of emails, wherein the graphically displaying of the inclusion relationship comprises identifying content that is duplicated across at least two emails within the plurality of emails. The method includes providing on the user interface an option of defining scope of recipients. The method includes, in response to the user selecting the option of defining scope of recipients, displaying a list of candidate recipients, for the user to determine scope of recipients. The method includes, in response to the user having determined the scope of recipients through the list, removing, from the user interface, recipients that were not in the scope of recipients and relationships associated with the recipients that were not in the scope of recipients and graphically displaying on the user interface the displayed recipients respectively corresponding to the plurality of emails based on the determined scope of recipients.

BRIEF DESCRIPTION OF THE DRAWINGS

Inventive features regarded as the characteristics of the present inventive subject matter are set forth in the Summary of the Inventive subject matter and the appended claims. However, the present inventive subject matter, its implementation mode, other objectives, features and advantages will be better understood through reading the following detailed description of the exemplary embodiments with reference to the accompanying drawings, wherein:

FIGS. 4A-4E depicts structure tables of emails, according to some example embodiments.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Some example embodiments provide a method and a system for managing emails, so as to display the relationship among emails in a visualized manner, such that a user can effectively avoid redundant operations on emails that have repetitive content. Some example embodiments enable a user of an email to intuitively and conveniently understand the relationship among emails via a user interface, and to conveniently perform proper processing of emails through interaction with the user interface.

Figure 1:
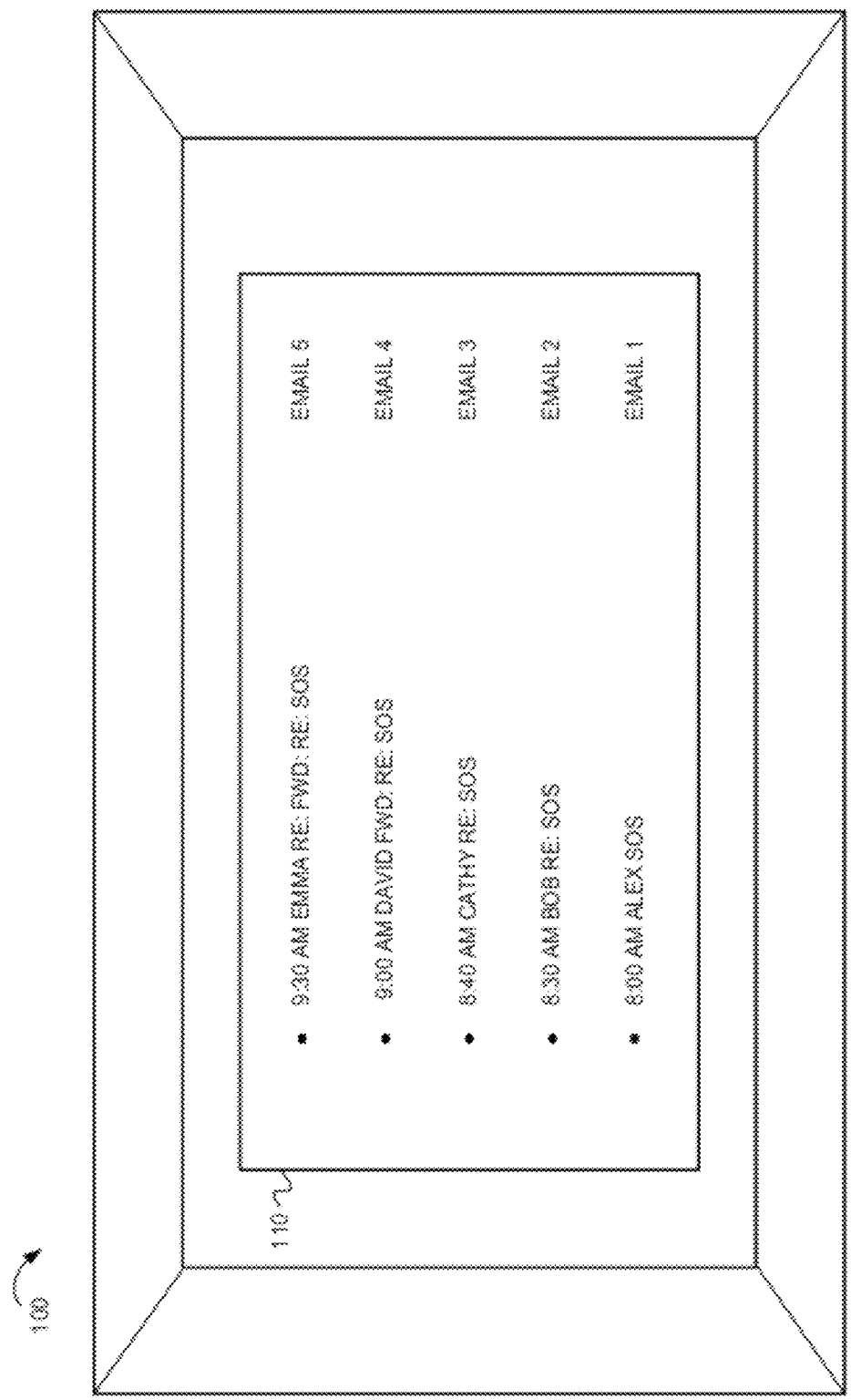
FIG. 1 depicts an email list, according to some example embodiments.

FIG. 1 depicts an email list, according to some example embodiments. An email list 110 is displayed on, for example, a user Frank's user terminal 100 connected to an email sever (not illustrated) via the network. In this example, the email list 110 includes five emails. For the convenience of depiction, in this figure, serial numbers of emails are provided in time order: email 1, email 2, email 3, email 4, and email 5.

Email 1 was received at 8:00 am, from Alex, subject "SoS." Email 2 was received at 8:30 am, from Bob, a reply to email 1 from Alex. Email 3 was received at 8:40 am, from Cathy, a reply to email 1 from Alex, but not including the original email 1. Email 4 was received at 9:00 am, from David, a forward of email 2 from Bob. Email 5: received at 9:30 am, from Emma, a reply to email 4 from David.

It should be noted that the form and content of the above list are only examples. For example, the list 110 as illustrated only lists emails having a same subject, while in an actual list, it might comprise emails having different subjects, and each item might further include more information, for example, the size of an email. FIG. 1 omits other information and emails having different subjects, so as to make illustration of example embodiments more concise. Additionally, for the convenience of depiction, sometimes "electronic mails" are also called "emails" in the specification and drawings.

Among the above email 1-email 5, email 2 is a reply (Re) to email 1 and includes all content of email 1. If user Frank opens email 2, he can read not only the content of Bob's reply to email 1 but also all content of email 1. At this point, email 1 can be deemed "useless." Email 4 is a forward (Fwd) of email 2 and includes all content of email 2; thus, email 2 is also "useless". Email 5 is a reply to email 4 and includes all content of email 4; thus, email 4 is also "useless."

In FIG. 1, two "useful" emails 3 and 5 are indicated in bold. Email 3 is a reply to email 1 but does not include the historical content of email 1. Because the content of email 3 is not included in any other emails, email 3 is "useful." Email 5 is a reply to email 4 and not included in any other emails, which is thus also useful.

For conventional systems, after receiving a plurality of emails having the same subject that are sent, replied to, or forwarded from others, an email user can hardly determine the relationships among these emails. As far as the emails as illustrated in FIG. 1 are concerned, Frank can completely know all the communication content as included in emails 1 to 5 just by reading email 3 and email 5. However, the problem lies in that Frank cannot clearly know the inclusion relationship among the 5 emails only from the email list in the inbox. For emails in the email outbox, the user also faces a similar problem.

Therefore, some example embodiments provide a method and system for intuitively displaying emails having the same subject and the inclusion relationships among them, such that an email client end user can efficiently process emails having the same subject.

Figure 2:
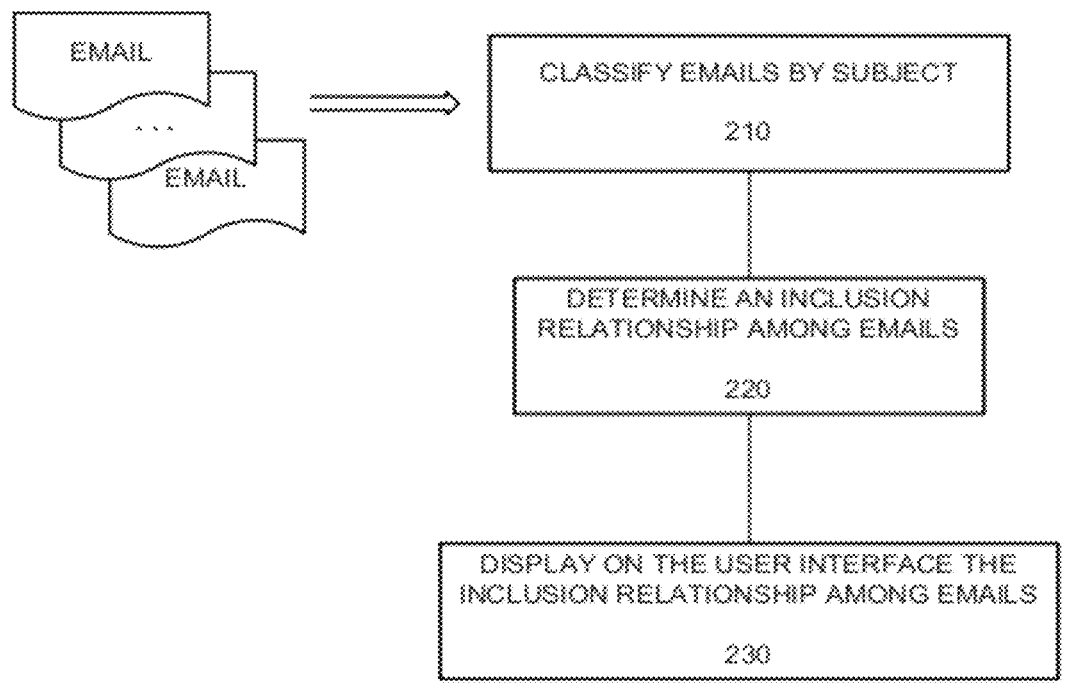
FIG. 2 depicts a flowchart of a method of managing emails at an email client, according to some example embodiments.

FIG. 2 depicts a flowchart of a method of managing emails at an email client, according to some example embodiments. The method of managing emails at an email client end as illustrated in FIG. 2 comprises the following operations. At block 210, emails having the same subject are identified. At block 220, an inclusion relationship among the emails is determined. At block 230, a user interface at the email client end is provided and the emails and the inclusion relationship among the emails are graphically displayed on the user interface.

Hereinafter, embodiments of the above various operations will be further illustrated. At block 210, emails having the same subject are identified. According to some example embodiments, an email may first be specified by a user, and then the subject of this email is extracted; next, the extracted subject is compared with the subject of other emails, thereby identifying emails having the same subject. The subject of an email may be identified and extracted based on the email structure.

Figure 3:
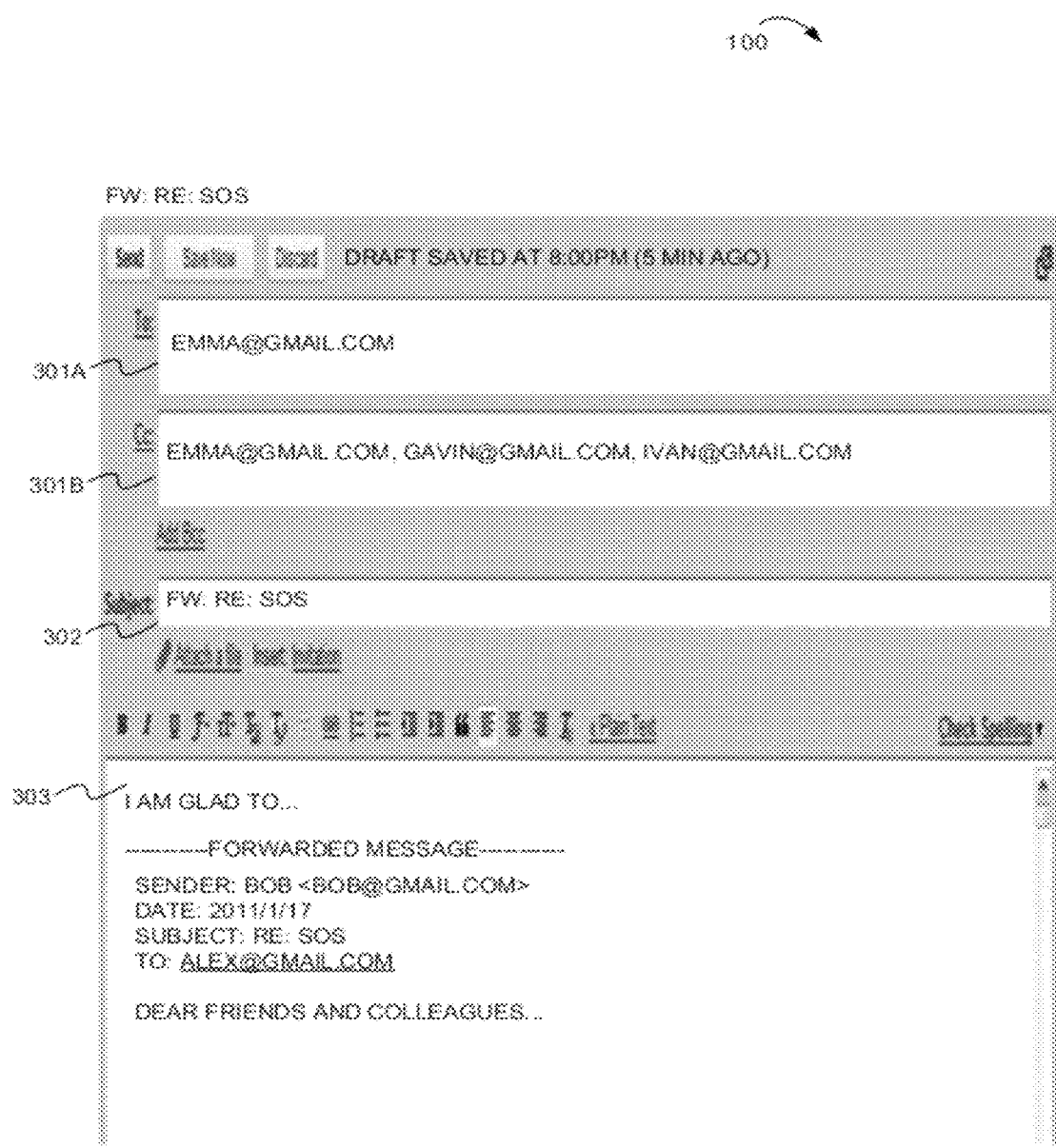
FIG. 3 depicts the structure of an email, according to some example embodiments.

In various kinds of email systems, an email generally comprises information such as sender, recipient, subject, and content. FIG. 3 depicts the structure of an email, according to some example embodiments. In FIG. 3, reference sign 301A represents a recipient field, which includes the email address of the recipient to which the email is to be sent. Reference sign 301B represents a cc (carbon copy) field, which includes the email address of the recipient to which this email is to be carbon copied. Both of the fields explicitly state the recipients of the email. The reference sign 302 represents a subject field, which includes the subject or title of the email. Reference sign 303 represents a content field, which includes content of the email, including information such as the text and image as inputted by the sender of the current email.

FIG. 3 illustrates that a user is writing an email, where the subject of the email is indicated by "Fwd:Re:SoS," with the content "I am glad to . . . "; this email will be sent (to) Emma@gmail.com (as indicated by reference sign 301A), and carbon copied (cc) to Frank@gmail.com, Gavin@gmail.com, and Ivan@gmail.com (as indicated by reference sign 301B). Here, Emma@gmail.com (or Emma) is the direct recipient of this email, while Frank@gmail.com (or Frank), Gavin@gmail.com (or Gavin) and Ivan@gmail.com (or Ivan) are cc recipients of this email. In the context of example embodiments, the direct recipients and the cc recipients are generally called "recipients."

For example, the information included in the subject field of the email as illustrated in FIG. 3 is "Fwd:Re:SoS." Based on a building rule for an email subject field of an email system, "Fwd:" and "Re:" indicate forward and reply, respectively, while "SoS" represents the subject matter of the email. Based on this building rule, it may be determined that the subject of this email is "SoS."

In this way, the subject of any email may be determined, and a plurality of emails having the same subject may be identified. It should be noted that building rules for emails from different email systems might be different, and when implementing some example embodiments, it would be ready for the skilled in the art to apply the above exemplary illustration for the building rule of an email system to other email systems.

Block 220 of FIG. 2 will be illustrated by referring to FIGS. 4A-4E and 5. At block 220, an inclusion relationship is determined among a plurality of emails having the same subject. In some example embodiments, the inclusion relationship among emails having the same subject is determined by building an email structure table. An email of any email system includes its structure information, for example, information regarding operations such as reply, forward, or carbon copy on historical emails as included in the email, and information regarding corresponding sender, recipient, and sent content, etc.

The email structure as illustrated in FIG. 3 includes such structure information. To those skilled in the art, it would be easy to extract structure information of the email from it. Based on the structure information of the email, an email structure table may be generated.

FIGS. 4A-4E depicts structure tables of emails, according to some example embodiments. As examples, the structure tables as illustrated in FIGS. 4A-4E correspond to emails 1 to 5 in the email list as illustrated in FIG. 1. For the convenience of depiction, the structure tables as illustrated in FIGS. 4A-4E are called structure table 1, structure table 2, structure table 3, structure table 4, and structure table 5, respectively.

For example, structure table 5 of FIG. 4E comprises 4 table rows, where the first row represents email 1 sent from Emma, and the second to fourth rows denote 3 historical emails included in email 1. The data in each table row depicts basic information of the corresponding email. For example, the email denoted by the fourth row is written and sent by Alex, with recipients being Bob and Cathy, cc to Frank. The fourth row also displays the subject, receipt time, text body size, whether an attachment is enclosed, and the size of the attachment of the email. For another example, the structure table 3 of FIG. 4C represents email 3. This table comprises only one table row. Email 3 is a reply to email 1 but does not include the content of email 1 or any historical email.

It should be noted that the content as included in the structure tables of FIG. 4A-4E is only an example. The structure table may include other content as required, for example, an attachment identification indicating different attachments, a content segment representing a brief depiction on the email body, etc. The structure tables as illustrated in FIGS. 4A-4E may be stored in a database so as to conveniently leverage the structure information of the email as indicated in the structure table.

Figure 5:
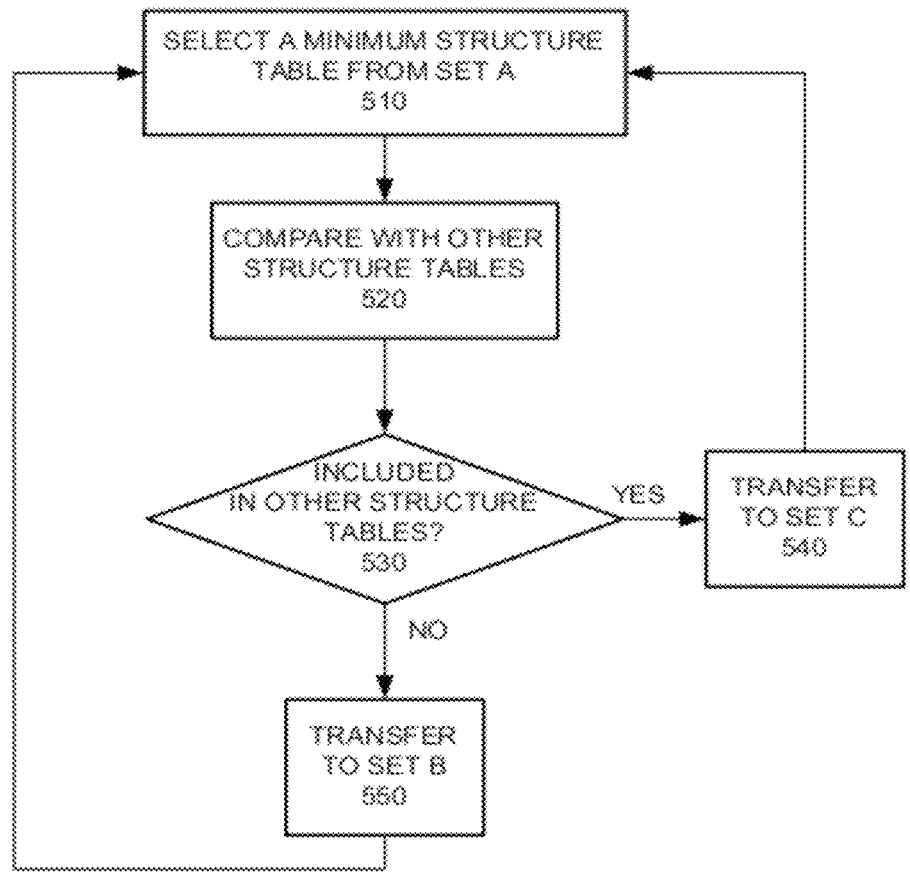
FIG. 5 depicts a flow of determining an inclusion relationship among emails according to some example embodiments.

FIG. 5 depicts a flow of determining an inclusion relationship among emails according to some example embodiments. The embodiment of FIG. 5 depicts the analyzing of the inclusion relationship among emails using the email structure table (hereinafter also referred to as "structure table"). The specific approach is to partition a set A of structure tables into set B and set C. None of the content of the emails corresponding to any structure table in set B has been included in other emails. All content of the emails corresponding to the structure tables in set C has been included in other emails.

Hereinafter, the flow of FIG. 5 will be illustrated with the 5 emails in FIG. 1 and FIGS. 4A-4E as an example. As an input, set A comprises structure tables 1-5 corresponding to the 5 emails, namely set A={structure table 1, structure table 2, structure table 3, structure table 4, structure table 5}.

At block 510, a structure table having the least number of rows is selected from set A. In this example, both structure table 1 and structure table 3 are structure tables having the least number of rows (i.e., 1 for both). In this case, either of structure table 1 and structure 3 may be selected.

At block 520, the selected structure table having the least number of rows is compared with other structure tables in set A.

At block 530, it is determined whether the selected structure table with the least rows is included in other structure tables. If yes, then block 540 is executed. Otherwise, block 550 is executed.

At block 540, the structure table with the least number of rows is added to set C while deleted from set A. For example, supposing the selected structure table is structure table 1, because structure table 1 has been included in other structure tables (for example, structure table 2), the structure table 1 is added into set C while deleted from set A.

At block 550, the structure table with the least number of rows is added into set B while deleted from set A. For example, suppose the selected structure table is structure table 3, although structure table 3 has only one row, it is not included in any other structure tables; thus, the structure table 3 is added to set B while deleted from set A. After completing block 540 or block 550, operations return to block 510. According to the flow as illustrated in FIG. 5, it is easily derived that set B={structure table 3, structure table 5}, and set C={structure table 1, structure table 2, structure table 4}.

Hereinafter, block 230 of FIG. 2 will be illustrated with reference to FIG. 6, where at this block, a user interface is provided at the email client end, and the emails and the inclusion relationship among the plurality of emails are graphically displayed on the user interface. According to some example embodiments, providing a user interface at an email client end and interacting with an email client end user via the user interface for managing the emails may be further implemented in various manners as described hereinafter and based on the email structure tables.

Figure 6A:
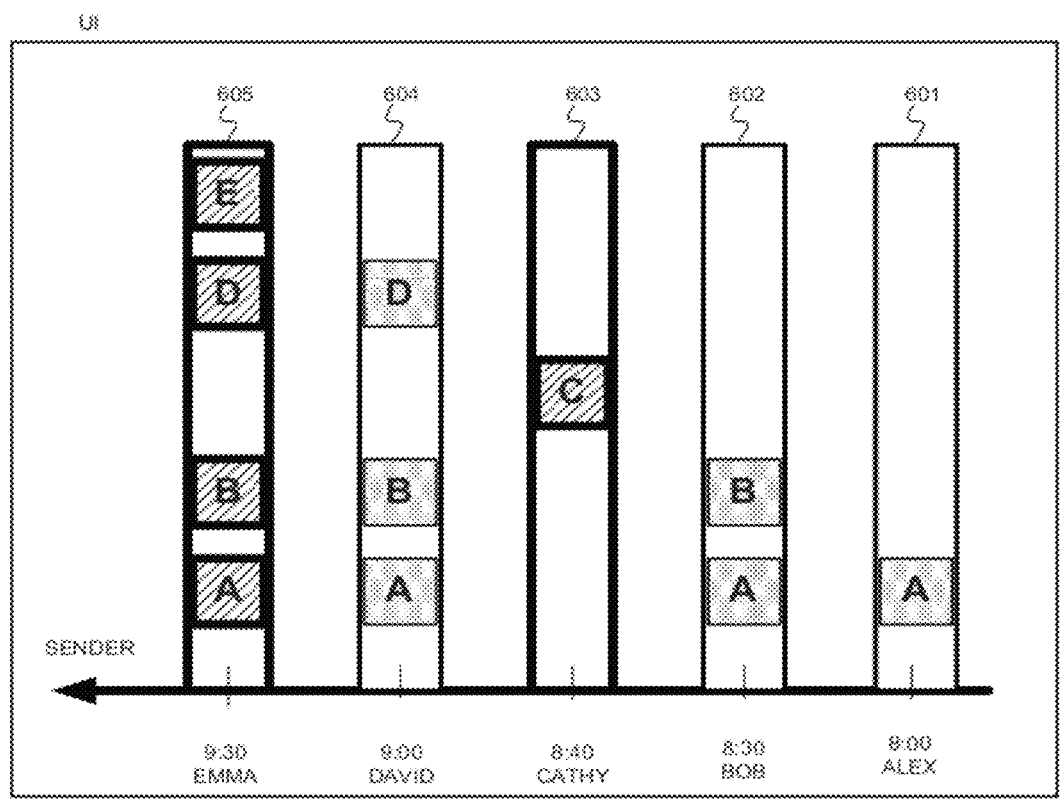
FIGS. 6A-6J depict user interfaces displayed, according to some example embodiments.

According to some example embodiments, a user interface may be provided at an email client end in the manner as illustrated in FIG. 6A. FIG. 6A depicts a user interface (UI) displayed, according to some example embodiments. For example, the UI is displayed on the email client end of user Frank. As illustrated in FIG. 6A, the user interface displays 5 bars: 601, 602, 603, 604, and 605. Each bar represents an email. For example, suppose bars 601, 602, 603, 604, and, and 605 represent email 1, email 2, email 3, email 4, and email 5 as illustrated in FIG. 1, respectively.

FIG. 6A further displays that one or more "email blocks" represented by blocks may also be visually included in each bar. Here, an "email block" represents an email that is written individually. For example, the bar 601 includes email block A, which represents that email 1 only includes the email written by Alex. The bar 602 includes email blocks A and B, which represents that email 2 includes the email complied by Alex and the email written by Bob. For another example, the bar 603 includes email block C, which represents that email 3 includes the email written by Cathy. By comparing the bar 602 with the bar 603, it may be seen that although the email 2 sent by Bob and email 3 sent by Cathy are replies to the email sent by Alex, email 3 sent by Cathy does not attach the email written and sent by Alex.

Actually, one bar in FIG. 6A corresponds to one structure table in FIGS. 4A-4E, while an email block corresponds to a table row of a structure table. In other words, based on the structure table as illustrated in FIGS. 4A-4E, the user interface UI as illustrated in FIG. 6A may also be generated. The user interface UI of FIG. 6A graphically illustrates the inclusion relationship among the 5 emails.

On the one hand, the user interface UI graphically illustrates these emails whose content is entirely included in other emails. For example, the bar 601 only comprises email block A, while the bars 602, 604, and 605 include email block A. Thus, all content of email 1 is completely included in other emails (namely, email 2, email 4, and email 5). Likewise, all content of email 2 (602) is included in other emails (email 4 and email 5); and all content of email 4 (604) is included in other emails (email 5).

On the other hand, the user interface UI graphically illustrates these emails whose content is not included in other emails. For example, bar 603 includes email block C, while none of other bars includes email C. Thus, all content of email 3 is not included in any other emails. Likewise, from the email block included in bar 605, it may be seen that all content of email 5 is not included in any other emails.

According to some example embodiments, alternatively, bars representing emails not included in any other emails may be highlighted on the user interface UI (e.g., bar 603 and bar 605). In FIG. 6A, the fact that two longitudinal edges of bar 603 appear wider than those of bar 602 indicates that the content of email 3 is not included in any other emails. Likewise, the fact that two longitudinal edges of bar 605 appear wider than those of bar 602 indicates that the content of email 3 is not included in any other emails. This representation manner is an alternative to the highlighting manner.

As illustrated in FIG. 6A, alternatively, the method of some example embodiments also displays the sender and/or receipt time of an email at proper locations on the user interface UI. For example, at the bottom of bar 605 are displayed "Emma" and "9:30," which represents that Frank receives the email sent from Emma at 9:30 am. In this case, a sequence of bars may be arranged based on the reception time or based on the names of senders. In case that there are many emails having the same subject, it is unnecessary to display emails all at once, but to display a part of emails in priority based on the sequence of reception time or based on the order of the recipients.

It should be noted that the user interface UI as illustrated in FIG. 6A uses bars and blocks to represent emails and the inclusion relationship among emails. However, some example embodiments are not limited to these specific representation manners. When implementing the user interface UI according to some example embodiments, other graphs or diagrams may be employed to replace these bars and blocks. When it is required to highlight the objects in the user interface UI, other manners of changing color and line style may also be employed to generate a visualized effect, as an alternative, supplementation, or enhancement of highlight.

What is described above is an embodiment of providing a user interface at an email client. However, the method of some example embodiments is not so limited. According to some example embodiments, processing or managing emails by a user may also be performed through interaction between the user and the user interface UI on the basis of providing the above user interface UI. Hereinafter, some other example embodiments will be further illustrated with reference to the figures.

According to one embodiment of the present inventive subject matter, the method of FIG. 2 further comprises: providing on the user interface an email deleting option that may be selected by a user for deleting one of the plurality of emails. In response to the user's operation of selecting the email deleting option, the email is deleted.

Figure 6B:
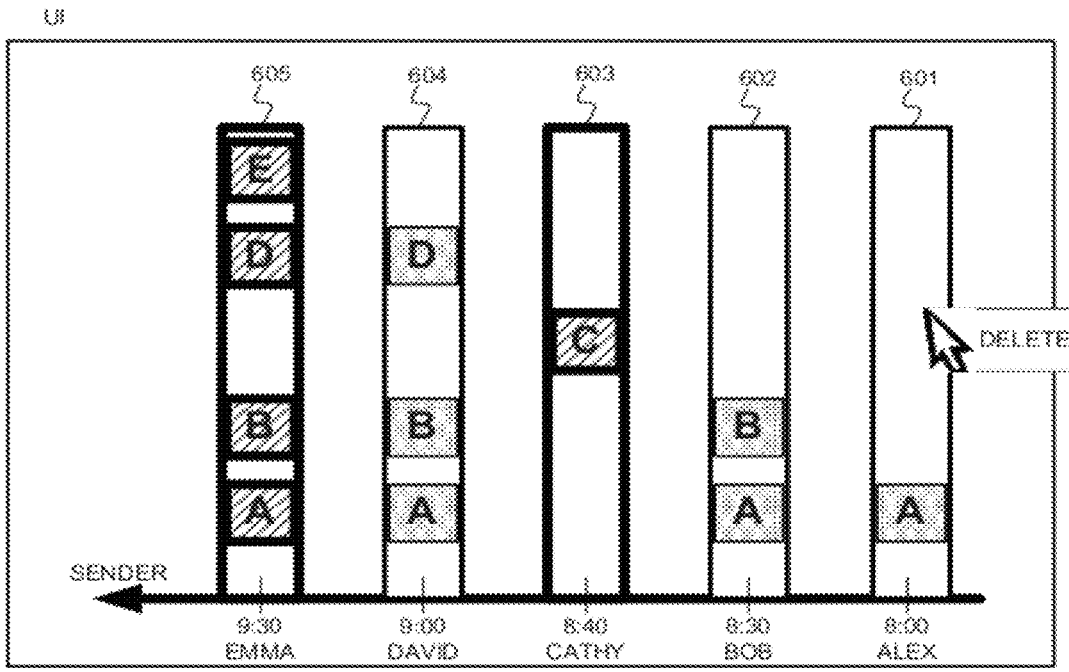
Figure 6C:
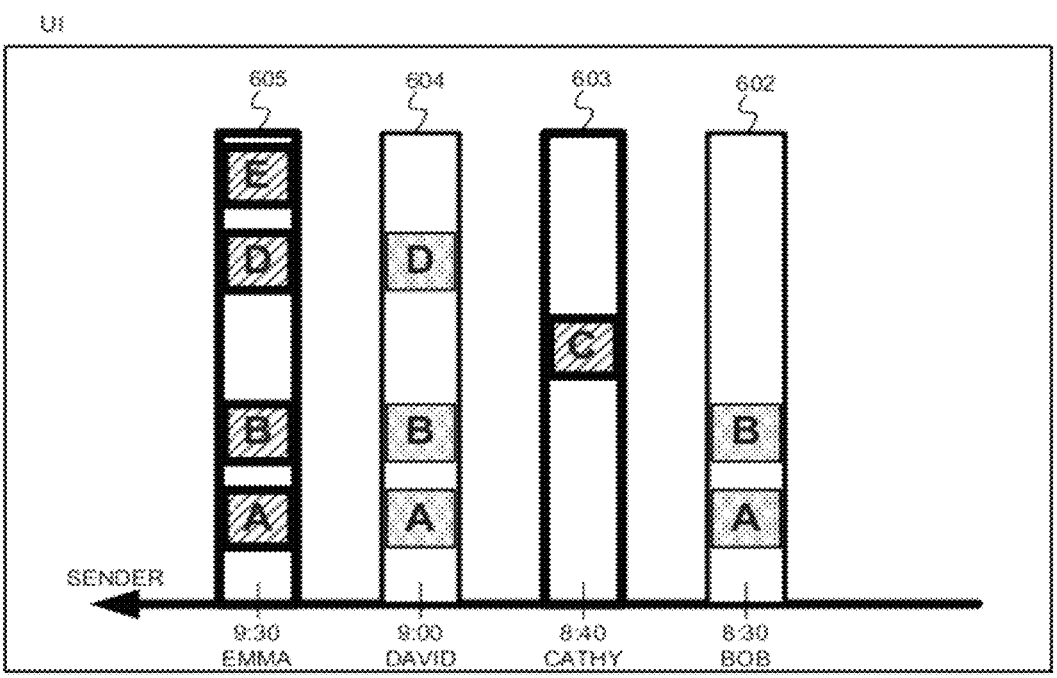

FIGS. 6B and 6C depict an implementation approach of the above embodiment. As illustrated in FIG. 6B, when user Frank moves the cursor to the bar 601 on the user interface UI, a proper location corresponding to the bar 601 displays a "delete" button, which represents that the user may select to delete email 1 represented by the bar 601. If Frank clicks on the button, then email 1 represented by bar 601 is deleted. For example, if the bar 601 is deleted from the user interface UI, then email 1 is deleted from the email box. FIG. 6C depicts the user interface UI with the bar 601 deleted, where the user interface UI merely displays the bars 602, 603, 604, and 605, which indicates that the bar 601 has been deleted.

According to some example embodiments, the email deleting option provided on the user interface and selectable by a user is a "delete" button corresponding to an email included in other emails among the plurality of emails. In this way, according to this embodiment, the user can only delete a useless email (namely an email included in other emails) on the user interface.

It should be noted that in the above embodiment, the email deleting function is provided by displaying a "delete" button on a certain bar (for example, the bar 601). However, some example embodiments are not so limited. For example, a pull-down menu (not illustrated) may also be provided, where a list of emails that may be deleted by the user are displayed on the menu are available for the user to select to delete one or more emails. Providing the email deleting function on the user interface UI enables the user to delete useless emails in time and conveniently after the user is clear about the inclusion relationship among emails.

According to some example embodiments, the method as illustrated in FIG. 2 further comprises: displaying on the user interface recipients respectively corresponding to the emails. Hereinafter, one implementation approach of this embodiment will be illustrated with reference to FIG. 6D.

Figure 6D:
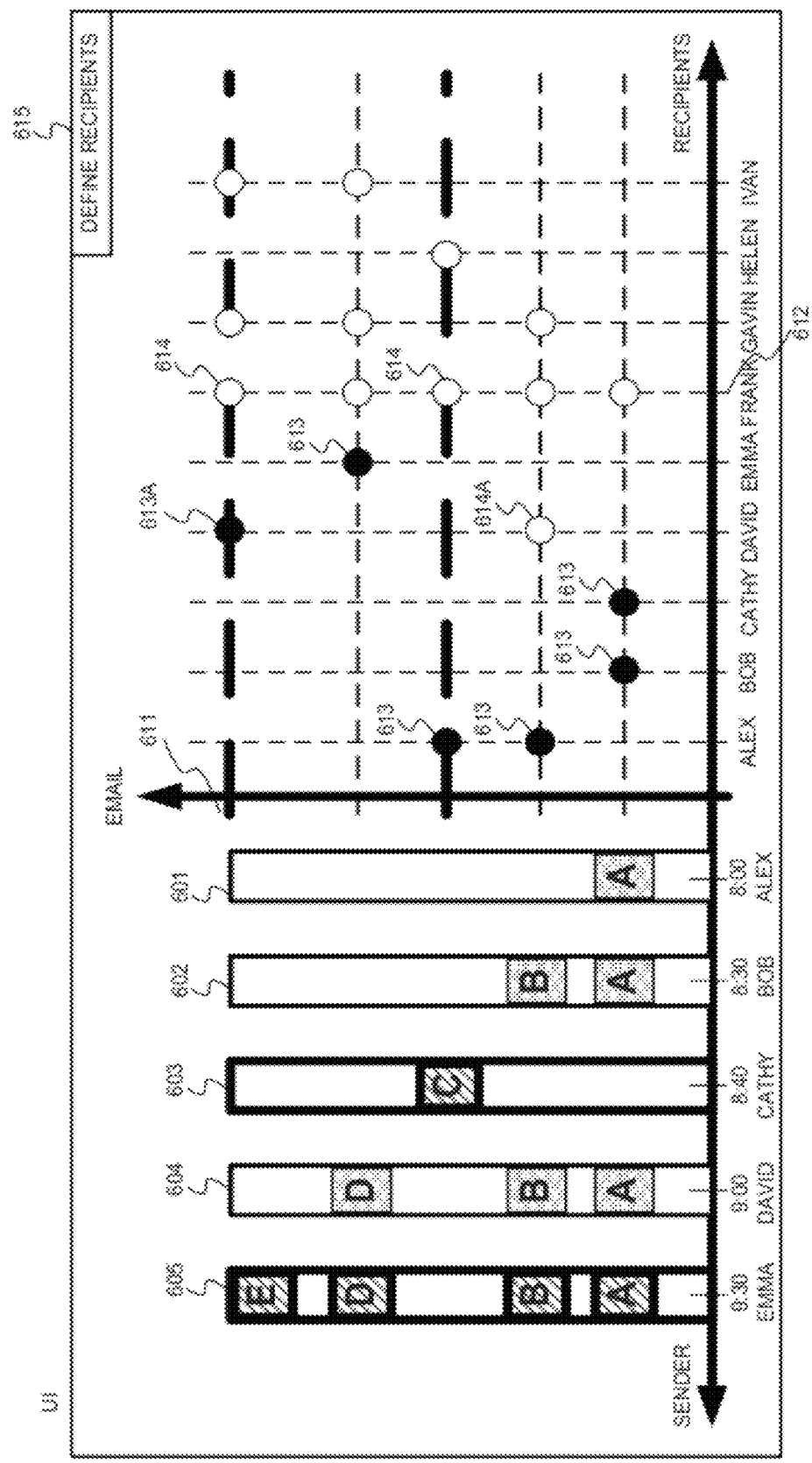

The left side of FIG. 6D displays the same content as FIG. 6B. In contrast, a two-dimensional graph comprising an X axis and a Y axis is added at the right side.

The Y axis of this two-dimensional graph represents emails, and respective scales 611 on the Y axis correspond to different emails. For example, blocks or email blocks A, B, C, D, and E in the right-side bar correspond to corresponding scales on the Y axis. The X axis of this two-dimensional graph represents recipients of emails, and respective scales 612 on the X axis correspond to different names.

In this two-dimensional graph, a plurality of dots 613 and circles 614 are dispersed. The X-axis scales and Y-axis scales of dots 613 or circles 614 represent the correspondence relationship between emails and recipients. Specifically, a dot 613 or circle 614 represents that the person corresponding to the X-axis scale is the recipient corresponding to the Y-axis scale.

Dots 613 and circles 614 with visual difference are employed in the user interface. Although such difference is not essential, it may be used to further distinguish the direct recipients from the cc recipients among the email recipients. In this example, a dot represents that the email is directly sent to the recipient, while a circle represents that the email is carbon copied (cc) to the recipient. For example, the person corresponding to the X-axis for dot 613A is David, and the email corresponding to the Y-axis is block E, which indicates that email 5 from Emma is directly sent to David. For another example, the person corresponding to the X-axis for dot 614A is David, and the email corresponding to the Y-axis is block B, which indicates that email 2 sent from Bob is carbon copied to David.

This representation manner may clearly indicate the correspondence relationship between emails and recipients. For example, Email 1 from Alex corresponding to block A is directly sent to Bob and Cathy while carbon copied to Frank. For another example, the emails received by Frank, Gavin, Helen, and Ivan are all carbon copied emails. It is quite important for a user to indicate the correspondence relationship between emails and recipients on the user interface UI, which is particular so in a cooperative working environment. For example, Frank wants to discuss with Bob on relevant issues in the email sent from Cathy. However, from the view of FIG. 6D, Frank can quickly know that Bob did not receive Cathy's email; thus, it is needed to provide suitable background material to Bob as the basis for discussion with Bob.

In a cooperative working environment, for example, a project development environment, emails always involve a wide variety of people. Sometimes, any particular user may only want to understand the relationship between an email and a particular group of people. For example, the particular user Frank has no connection with Gavin, Helen, and Ivan and is not concerned about the relationship among Gavin, Helen, and Ivan and any email. Thus, he prefers not displaying Gavin, Helen, and Ivan on the user interface UI. In order to satisfy this demand, the method according to some example embodiments may control the scope of displaying recipients on the user interface through interaction with the user on the user interface.

According to some example embodiments, the method of FIG. 2 further comprises: providing an option of defining the scope of recipients on the user interface. In response to the user selecting the option of defining the scope of recipients, displaying a list of candidate recipients, for the user to determine the scope of recipients. In response to the user having determined the scope of recipients, displaying on the user interface the recipients respectively corresponding to the plurality of emails according to the determined scope of recipients. Hereinafter, a specific implementation manner of this embodiment will be illustrated with reference to FIGS. 6D and 6E.

Figure 6E:
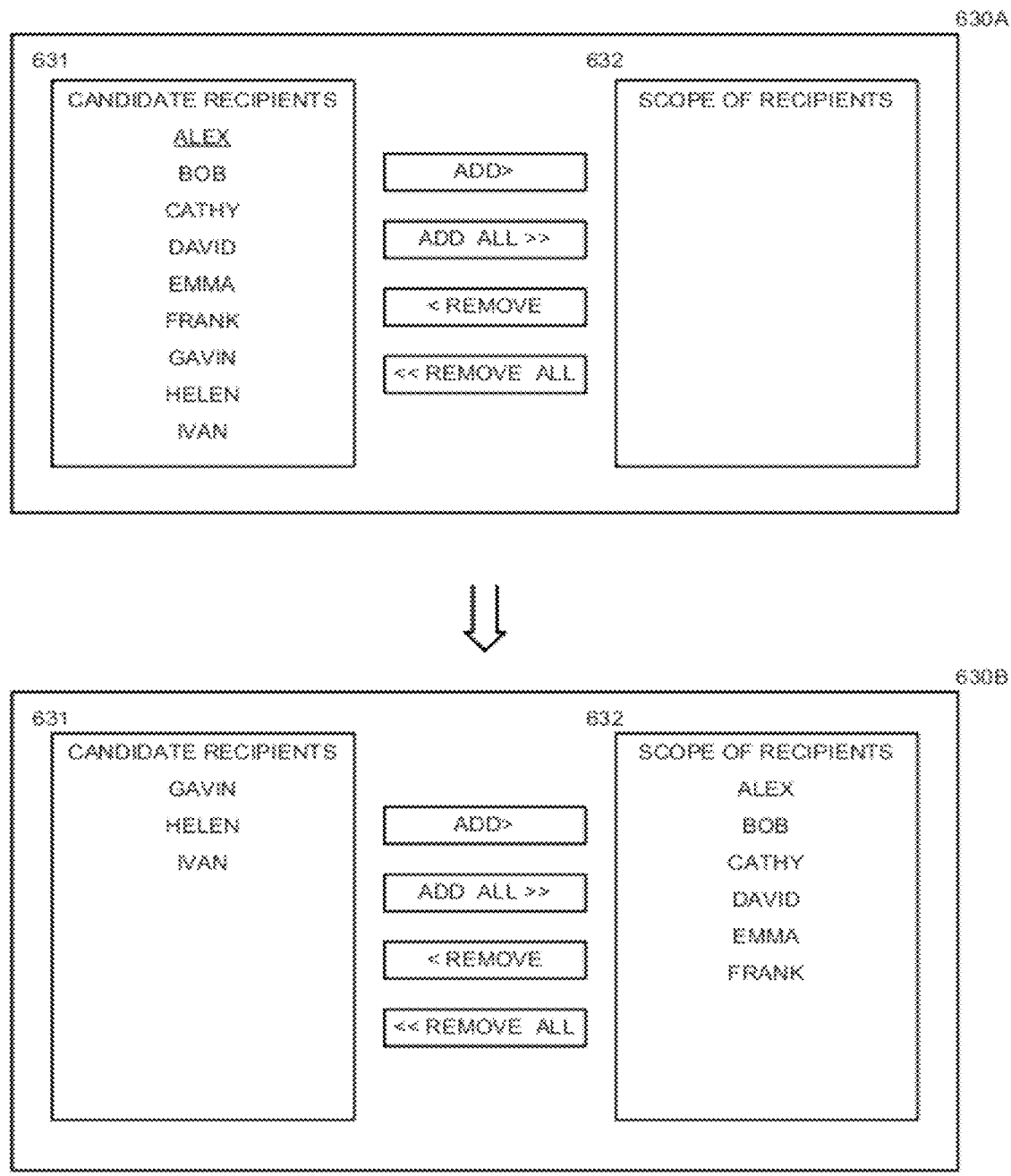

As illustrated in FIG. 6D, on the user interface is further displayed an option 615 of "Define Recipients" in a form such as a button, which is available for the user to select. If the user clicks on the "Define Recipients" button 615, on the user interface is displayed an interactive interface 630A as illustrated in FIG. 6E. This interactive interface 630A displays a list 631 of the candidate recipients, such that the user determines the scope of recipients displayed on the user interface by selecting the recipients in the list.

Figure 6F:
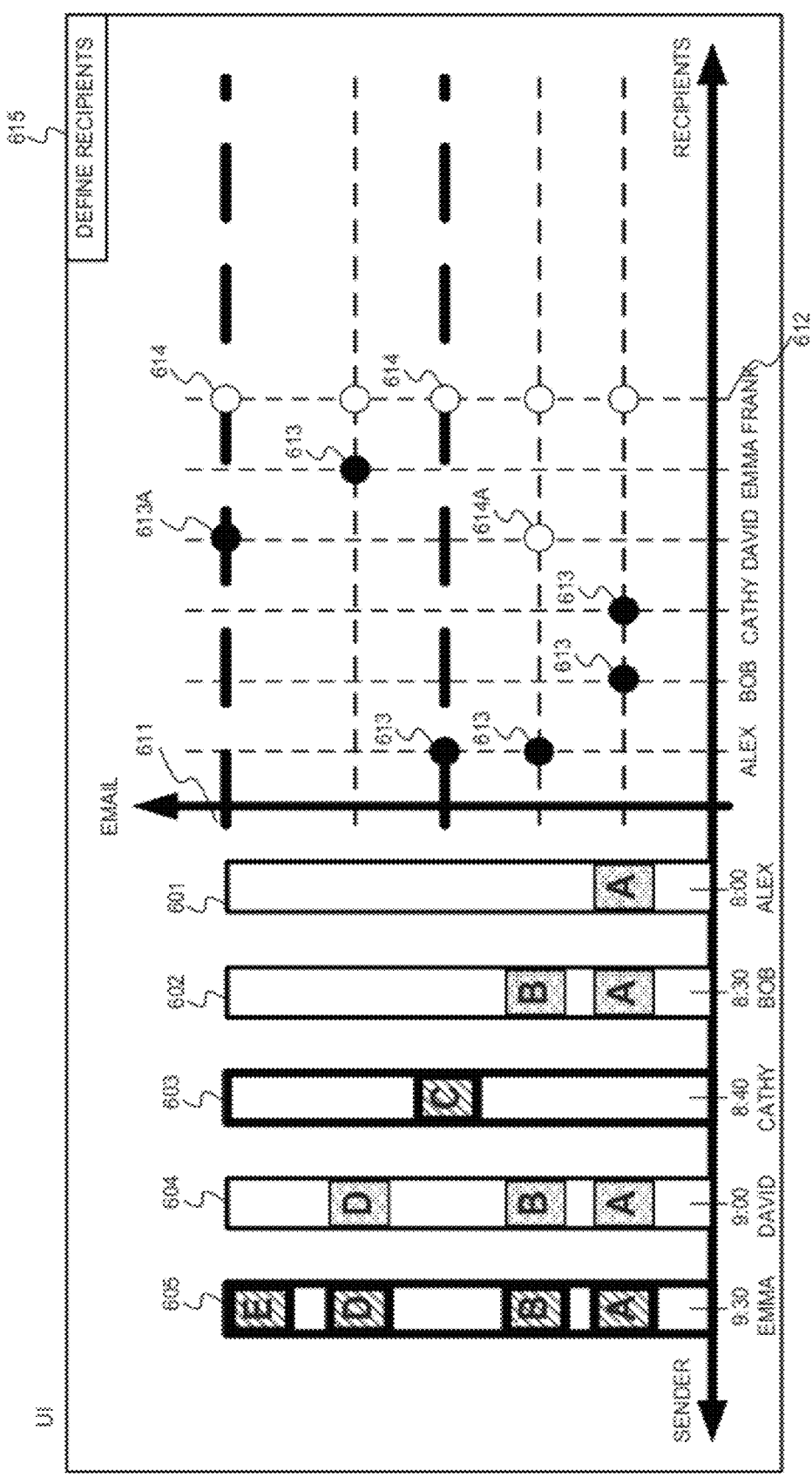

For example, the user selects "Alex" in the list 631, and then clicks on the "add>" button. "Alex" is added to the list 632 indicating the scope of recipients. By similar operation, all the desired recipients may be added to the list 632. At this point, the initially displayed interactive interface 630A is changed to the interactive interface 630B as illustrated in the lower part of FIG. 6E, where the name list of the recipients in the list 632 determines the scope of recipients, namely {Alex, Bob, Cathy, David, Emma, Frank}. According to this embodiment, after the user determines the scope of recipients through the list, recipients are displayed on the user interface according to the determined scope of recipients. The result is illustrated in FIG. 6F. Compared with FIG. 6D, recipients in FIG. 6F only comprise {Alex, Bob, Cathy, David, Emma, Frank}.

According to some example embodiments, the method of FIG. 2 further comprises: displaying on the user interface a content segment and an attachment identification corresponding to email blocks included in a given email. The specific implementation manner of this block is illustrated in FIG. 6G.

Figure 6G:
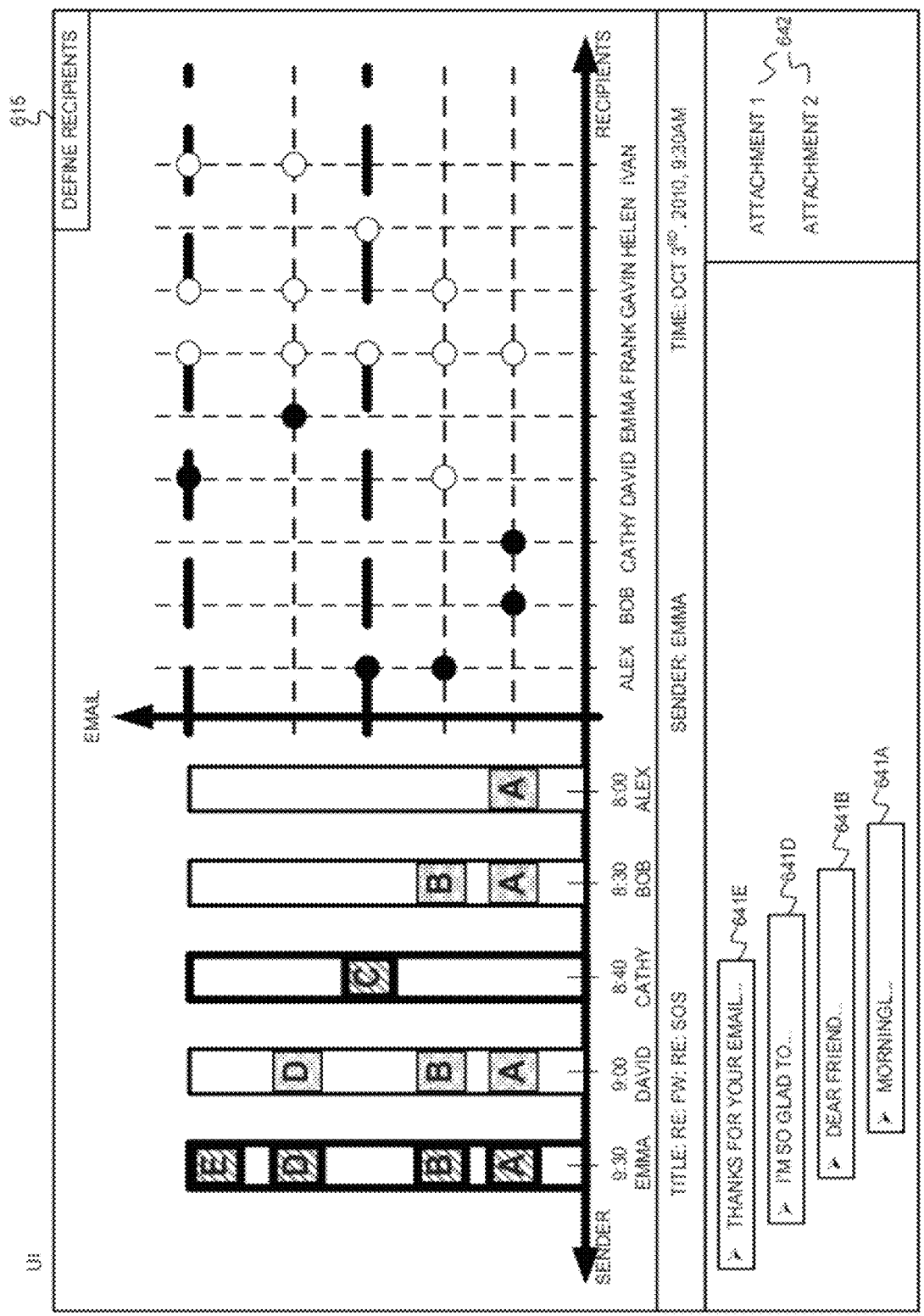

As illustrated in FIG. 6G, at the bottom of the user interface UI are displayed content segments 641A, 641B, 641D, and 641E and two attachment identifications 642. Without being specified by the user, a given email is the email that is received most recently. In this example, it is email 5 sent from Emma.

As illustrated by bar 605 in FIG. 6G, email 5 sent from Emma includes email blocks A, B, D, and E. Correspondingly, content segment 641A "Morning . . . " corresponds to email block A. Content segment 641B "Dear friend . . . " corresponds to email block B. Content segment 641D "I am glad to . . . " corresponds to email block D. Content segment 641E "Thanks for your email . . . " corresponds to email block E. Besides, email blocks A and D carry attachments, respectively. Correspondingly, attachment identification 642 "Attachment 1" indicates the attachment of email block A, and attachment identification 642 "Attachment 2" indicates the attachment of email block D.

As mentioned above, FIG. 6G illustrates content segments and attachments displayed for email 5 sent from Emma. According to some example embodiments, content segments and attachments may be displayed for any email in response to the user's selection. For example, when the user moves the cursor to the bar 604, it may be deemed that the user is specifying email 4 represented by bar 604, thereby displaying the content segments and attachment identifications corresponding to email blocks A, B, and D included in email 4.

As depicted on FIGS. 4A-4E, content segments and attachment identifications of an email may be included in an electrical structure table. Thus, when implementing some example embodiments, content segments and attachment identifications may be displayed in the user interface based on such a structure table, and the emails are displayed in association with their corresponding content segments and attachment identifications based on the association of the content segments and attachment identifications with the emails where they are in. According to the above manner, displaying the content segments and attachment identifications corresponding to the email blocks included in an email helps the user to quickly browse general content of any email on the user interface.

Figure 6H:
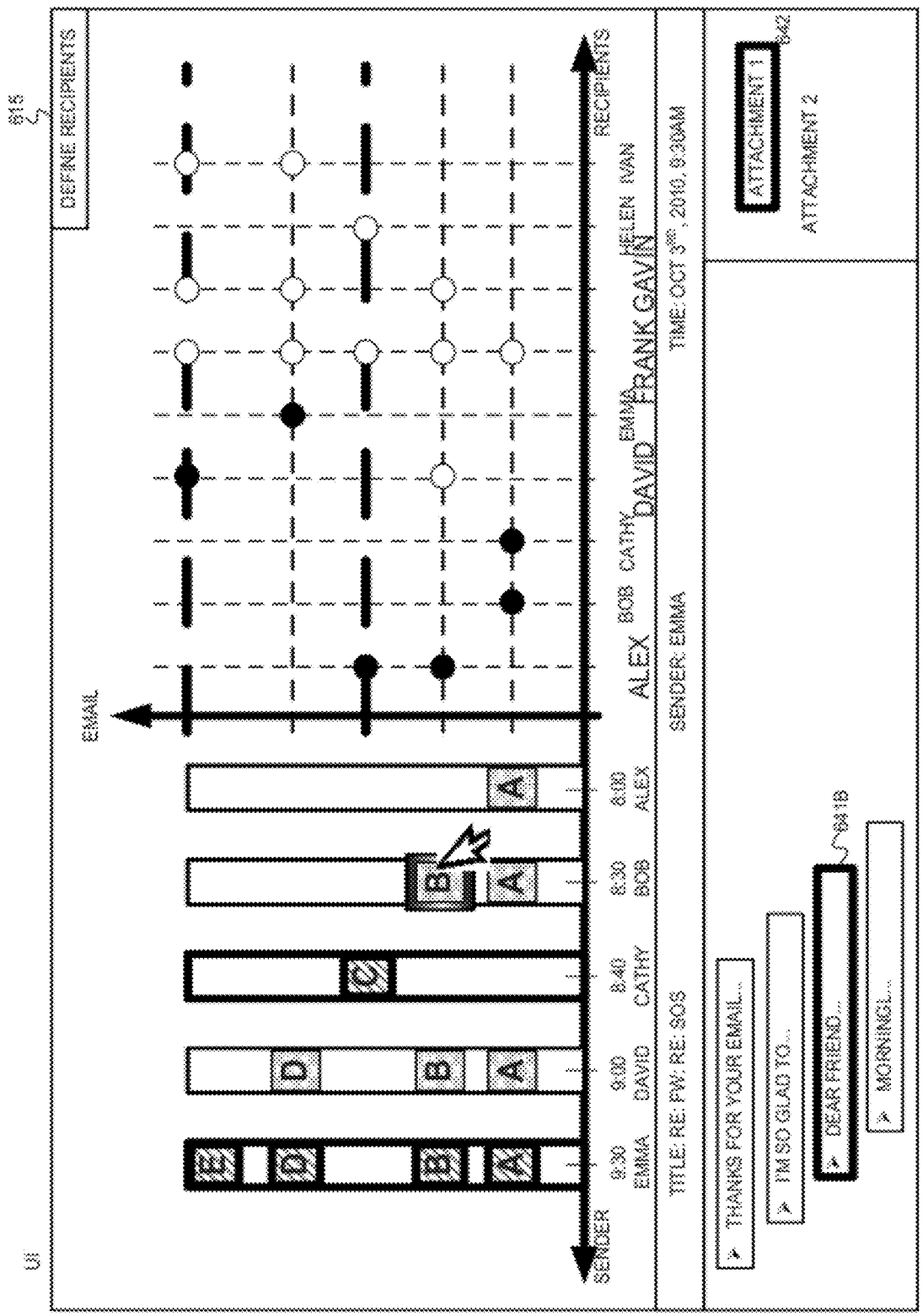

According to some example embodiments, the method of FIG. 2 further comprises: in response to the user selecting an email block, highlighting the email including the selected email block, the content segment and attachment identification corresponding to the selected email block, and the recipients of the email represented by the selected email block. For example, as illustrated in FIG. 6H, if the user double clicks on the email block B (for example, on bar 602) with a mouse, then in the user interface are highlighted the bar 602 where the email block B is located, the content segment 641B and attachment identification 642 "Attachment 1" corresponding to the email block B, and recipients Alex, David, Frank, and Gavin of the email (email 2) represented by email block B. In this way, for any email (for example, email 2) on the user interface, the user may conveniently understand the summary and attachment name as included in email 2, as well as the recipients receiving the email 2, only by performing simple operation on the user interface.

According to some example embodiments, the method of FIG. 2 further comprises: in response to the user selecting a content segment, highlighting an email that includes the content represented by the selected content segment and the recipients of the email; in response to the user selecting an attachment identification, highlighting an email that includes the attachment represented by the selected attachment identification and the recipients of the email.

Figure 6I:
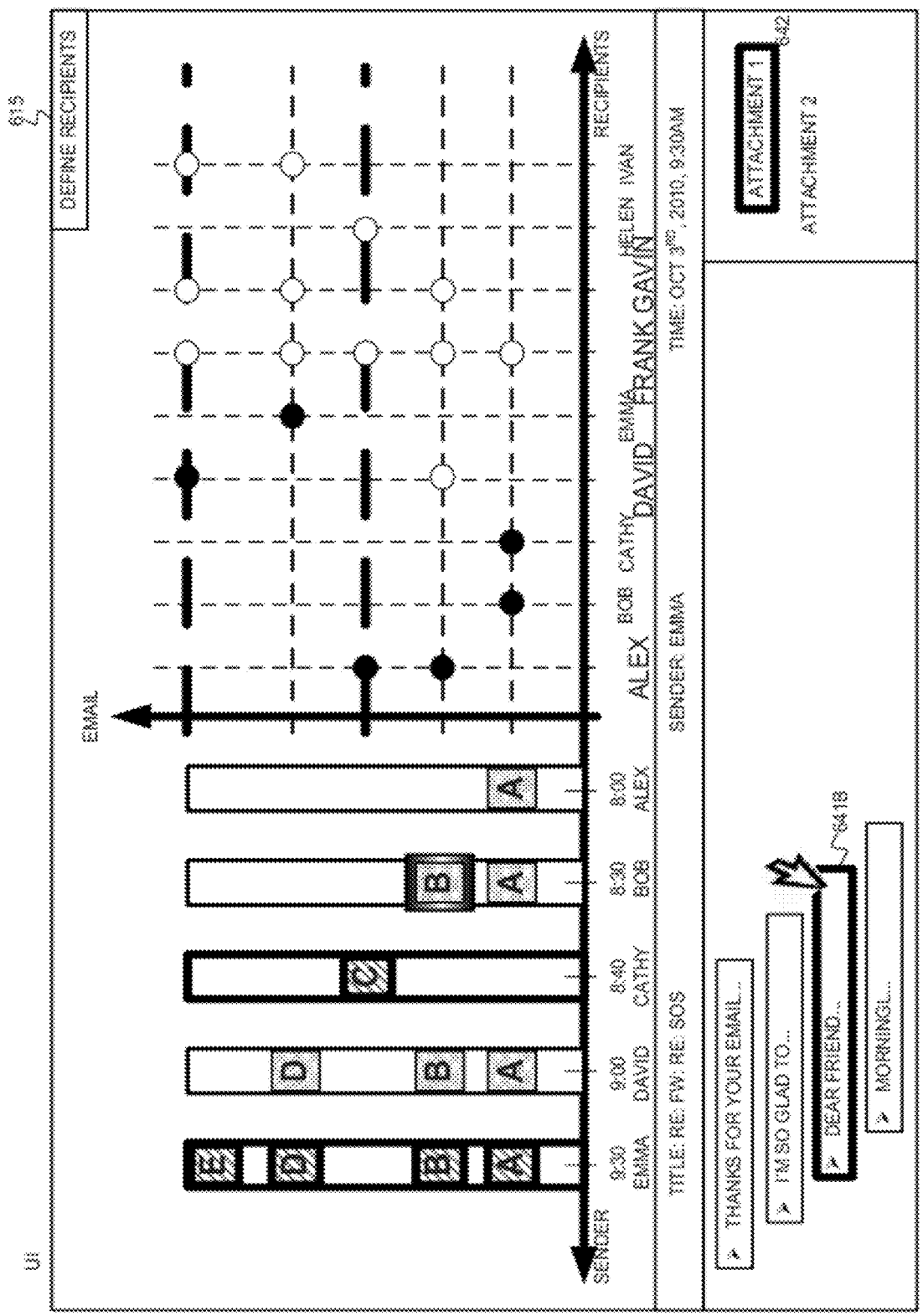

For example, as illustrated in FIG. 6I, if the user double clicks on the content segment 641B with a mouse, then the bars 602, 604, and 605 and recipients Alex, David, Frank, and Gavin are highlighted on the user interface UI. Likewise, if the user double clicks on attachment identification 642 "Attachment 1" (not illustrated) with a mouse, then the bars 602, 604, and 605 and recipients Alex, David, Frank, and Gavin are highlighted on the user interface UI. In this way, only by simple operation the user may conveniently learn the email corresponding to the interested content segment, the recipients who have received the email, and conveniently know the email where the interested attachment is located and the recipients who have received the email.

Figure 6J:
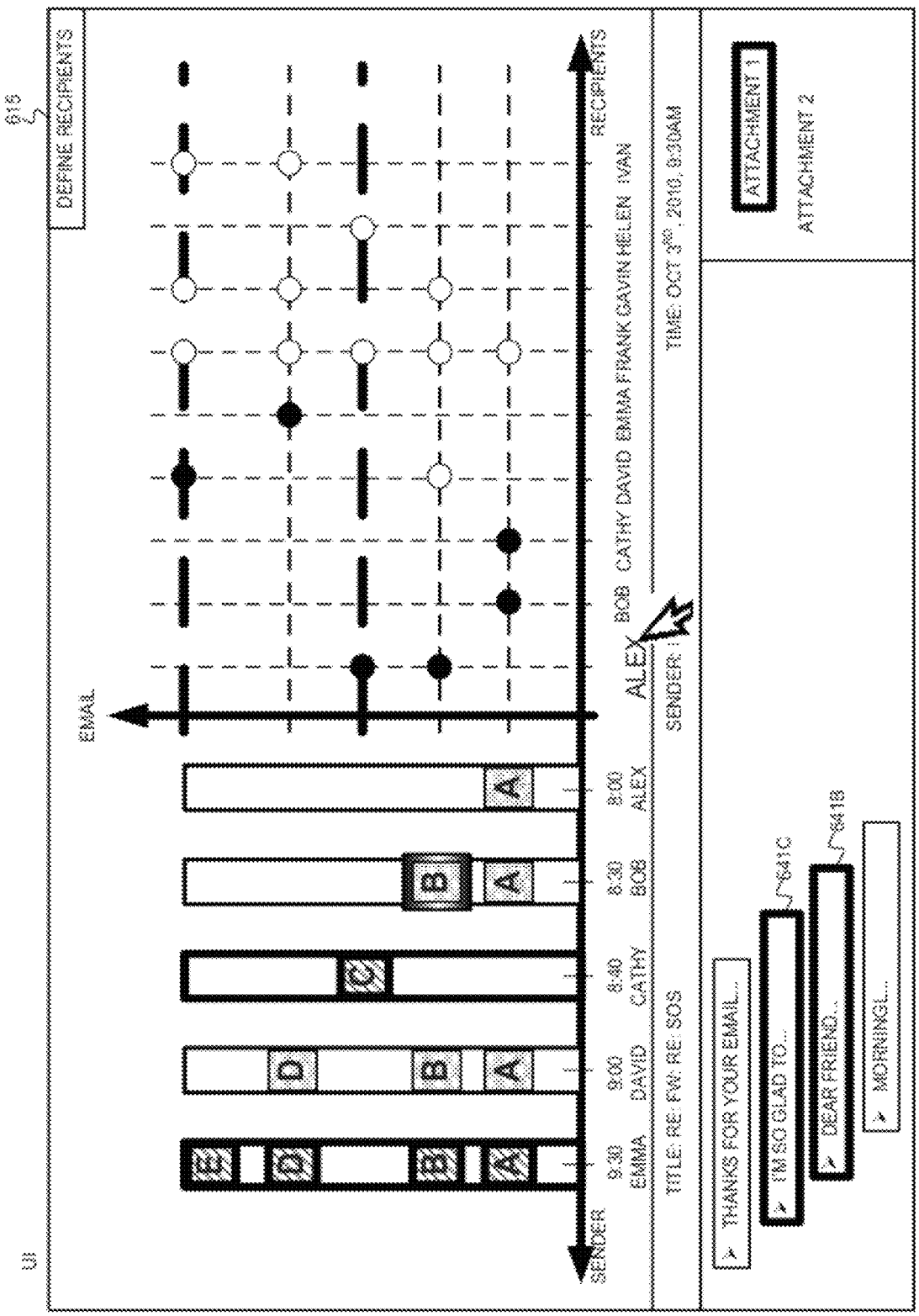

According to some example embodiments, the method of FIG. 2 further comprises: in response to the user selecting a recipient, highlighting the email received by the selected recipient and/or the content segments and attachment identifications included in the email. As illustrated in FIG. 6J, if the user double clicks on recipient Alex with a mouse, then the bars 602 and 603 representing email 2 and email 3 as received by Alex, content segments 641B and 641C and the attachment identification 642 "Attachment 1" are highlighted on the user interface UI.

Of course, it may only highlight the bars 602 and 603 or only highlight the content segments 641B and 641C and the attachment identification 642 "Attachment 1." In this case, only by simple operation, the user may conveniently know the emails received by any interested person, as well as the contents in these emails.

Figure 7:
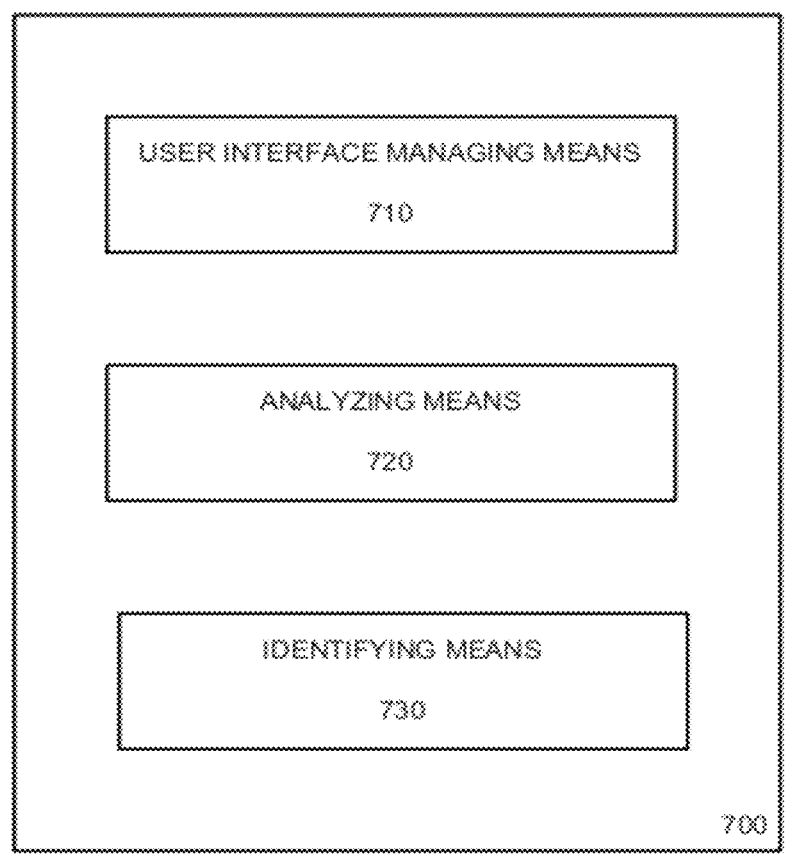
FIG. 7 depicts a block diagram of a system for managing emails, according to some example embodiments.

What is described above is a method of managing emails at an email client, according to some example embodiments. Some example embodiments also provide a system for managing emails. FIG. 7 depicts a block diagram of a system for managing emails, according to some example embodiments. As illustrated in FIG. 7, the system 700 of managing emails comprises: identifying means 701, analyzing means 720, and user interface managing means 730.

The identifying means 710 is for identifying a plurality of emails having a same subject. The analyzing means 720 is for determining an inclusion relationship among the plurality of emails. The user interface managing means 730 is for providing a user interface at the email client and graphically displaying on the user interface the plurality of emails and the inclusion relationship among the plurality of emails.

The identifying means 710, analyzing means 720 and user interface managing means 730 correspond to blocks 310, 320, and 330 in the method of managing emails as above depicted with reference to FIG. 3; thus, their functions and implementation manners will not be in detailed here.

According to some example embodiments, the user interface managing means 730 is further configured to provide on the user interface an email deleting option that may be selected by a user for deleting one of the emails; in response to the user selecting the email deleting option, deleting the email specified by the operation. According to some example embodiments, the user interface managing means 730 is further configured to display on the user interface the recipients respectively corresponding to the emails, where the recipients include direct recipients and cc recipients.

According to some example embodiments, the user interface managing means 730 is further configured to provide on the user interface an option of defining the scope of recipients and to display a list of candidate recipients in response to the user selecting the option of defining the scope of recipients, for the user to determine the scope of recipients; in response to the user having determined the scope of recipients, to display on the user interface the recipients respectively corresponding to the plurality of emails according to the determined scope of recipients. According to some example embodiments, the user interface managing means 730 is further configured to display on the user interface a content segment and an attachment identifications corresponding to the email blocks included in a given email. According to some example embodiments, the given email is the email selected by the user.

According to some example embodiments, the user interface managing means 730 is further configured to: in response to the user selecting an email block, highlight the email including the selected email block, the content segments and attachment identifications corresponding to the selected email block, and the recipients of the email represented by the selected email block. In response to the user selecting a content segment, highlight the email including the content represented by the selected content segment and the recipients of the email. In response to the user selecting an attachment identification, highlight the email including the attachment represented by the selected attachment identification and the recipients of the email. In response to the user selecting a recipient, highlight the email received by the selected recipients and the content segments and attachment identifications included in the email.

According to some example embodiments, there further comprises means for generating corresponding email structure tables based on the structures of the plurality of emails, respectively, where the analyzing means 720 determines the inclusion relationship among emails corresponding to the email structure tables based on the inclusion relationship among email structure tables.

What is described above is a system for managing emails, according to some example embodiments. Because the method of managing emails according to some example embodiments has been described in detail, in the above depiction on the system, what is omitted here is the content apparently repetitive with the method of managing emails according to some example embodiments or the content, which can be easily derived from the depiction on the method of managing emails, according to some example embodiments.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C"

programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for movement reduction as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of managing emails by an email client operating on a computing device, the method comprising:
    identifying, by the email client, a plurality of emails having a related subject;
    presenting, in a graphical user interface (GUI) of the computing device, sender identifiers at first coordinates on an x-axis of a Cartesian plane, and recipient identifiers at second coordinates on the x-axis, wherein a y-axis of the Cartesian plane divides the sender identifiers and the recipient identifiers;
    presenting, at third coordinates of the Cartesian plane that are above each sender identifier, sent-email block identifiers identifying one or more sent-email blocks for each sender identifier;
    presenting, at fourth coordinates of the Cartesian plane that are above at least one of the recipient identifiers, received-email block identifiers identifying one or more received email blocks for the at least one of the recipient identifiers;
    determining, by the email client, an inclusion relationship among the plurality of emails, wherein the inclusion relationship identifies at least one of the sent email blocks that is included in multiple of the plurality of emails; and
    removing, from the GUI, the at least one of the sent-email blocks that is included in multiple of the plurality of emails.

2. The method according to claim 1, further comprising:
    providing, in the GUI, an email deleting option for deleting a selected one of the plurality of emails; and
    deleting the selected one of the plurality of emails.

3. The method according to claim 2, wherein the email deleting option includes a delete button corresponding to the at least one of the sent-email blocks that is included in multiple of the plurality of emails.

4. The method according to claim 1, wherein at least some of the received-email block identifiers further identify some of the one or more received-email blocks as being sent as carbon copies.

5. The method according to claim 1, further comprising:
    displaying, in the GUI, a content segment and an attachment identification corresponding to a particular one of the plurality of emails.

6. A method of managing emails by an email client operating on a computing device, the method comprising:
    identifying, by the email client, emails having a related subject;
    determining senders and recipients of the emails;
    presenting, in a graphical user interface (GUI) of the computing device, a selectable list of the recipients;
    receiving, via the GUI, user input indicating selected recipients;
    presenting, in a graphical user interface (GUI) of the computing device, sender identifiers at first coordinates on an x-axis of a Cartesian plane, and recipient identifiers at second coordinates on the x-axis, wherein a y-axis of the Cartesian plane divides the sender identifiers and recipient identifiers, and wherein each sender identifier is associated with one of the senders, and each receiver identifier is associated with one of the selected recipients;
    presenting, at third coordinates of the Cartesian plane that are above each sender identifier, sent-email identifiers identifying one or more of the emails associated with the each sender identifier; and presenting, at fourth coordinates of the Cartesian plane that are above at least one of the recipient identifiers, received-email identifiers identifying one or more of the emails received by recipients associated with the recipient identifiers.

7. The method according to claim 6, further comprising:
displaying, in the GUI, a content segment and an attachment identification corresponding to an email block included one of the emails.

8. The method of claim 6, further comprising:
generating a structure table for each of the emails, wherein each structure table includes the following information for all email blocks with each of the emails: sender, recipient, carbon copy indicator, forward indicator, attachment indicator, and receipt time indicator.

\* \* \* \* \*